United States Patent Office 3,038,119
Patented June 5, 1962

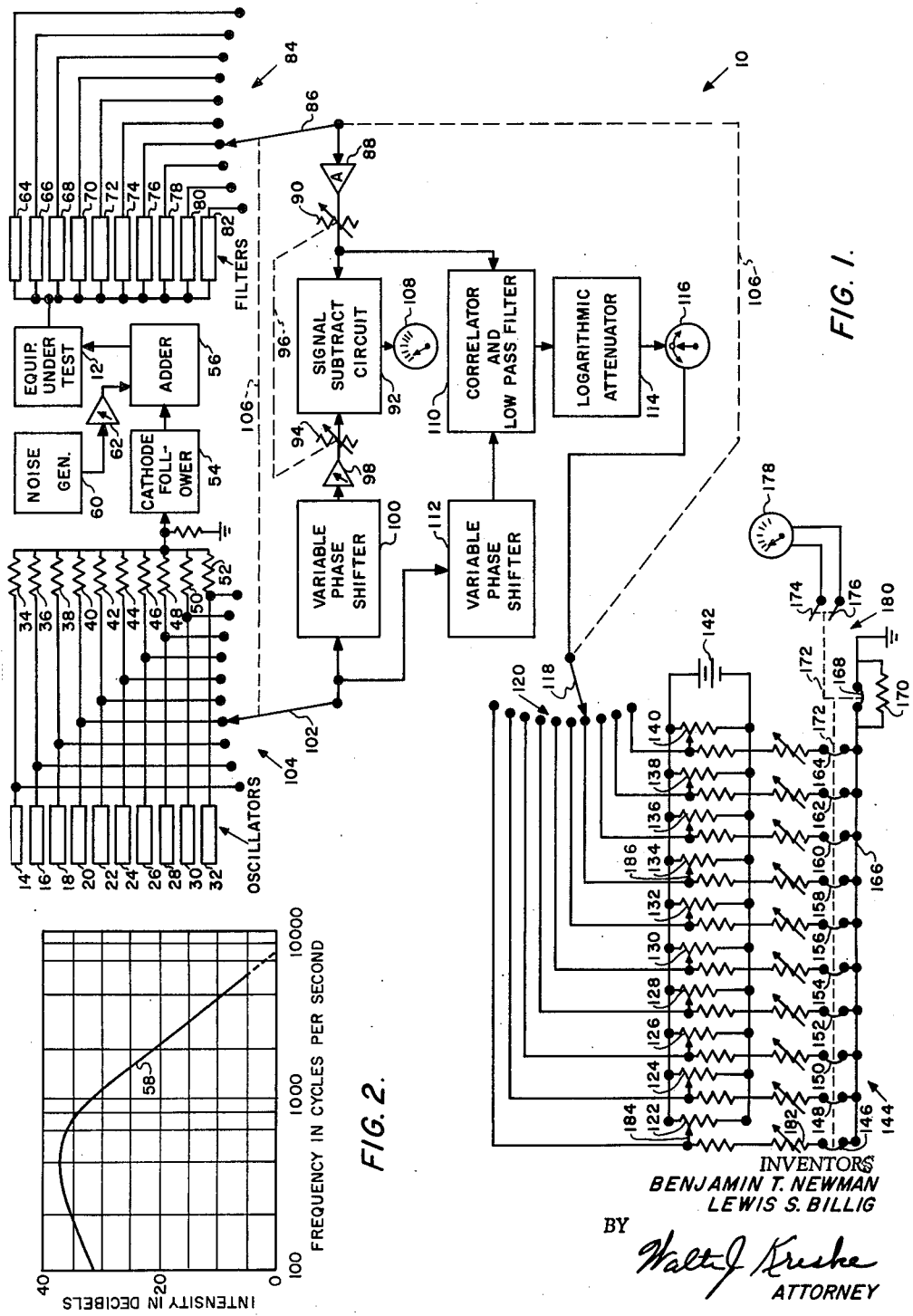

3,038,119
INFORMATION SIGNAL INTELLIGIBILITY
MEASURING APPARATUS
Lewis S. Billig, Wayland, and Benjamin T. Newman, Dedham, Mass., assignors to General Electronic Laboratories, Inc., Cambridge, Mass., a corporation of Massachusetts
Filed Mar. 17, 1958, Ser. No. 721,998
11 Claims. (Cl. 324—57)

This invention relates to intelligibility measuring apparatus for electric information signals such as of speech, and more particularly to apparatus suitable for testing information signal traversing equipment such as receivers, transmitters and the like under simultaneous occurrence of simulated information signals and interference signals, and predicting therefrom operation of the equipment under actual information and interference signal conditions.

Important limitations or problems in the analysis and testing of signal traversing equipment to determine its effect on the intelligibility of speech or other information signals traversing therethrough are the rapidity and ease with which such tests can be performed and the accuracy of the test results. Intelligibility tests on speech performed directly with the human ear, besides requiring prohibitively long time periods for their performance, also varied widely in determined intelligibility values, depending upon the particular individual performing the tests and the acuteness of auditory perception of the individual on whom the tests were performed. Apparatus heretofore used for this purpose, while providing an improvement over the above mentioned human variants and substantial saving in test time over that by direct use of the human ear, nevertheless, requires substantial time for the performance of such tests and is relatively intricate in construction. Such equipment has been generally based upon a comparison between two types of signals, namely, a comparison of the information signal immersed in noise to the information signal free of noise.

Pursuant to the present invention a simplified apparatus has been devised wherein the determination of intelligibility of information signals is relatively simple and rapid and provides a good approximation of actual use conditions. This apparatus is particularly applicable to signal traversing equipment such as receivers and receiver-transmitter systems. It may be used in performing tests thereon for determining or predicting the effect of such equipment on the intelligibility of the information signals passing therethrough under various noise and other actual use conditions. This apparatus is so devised that combined information signals and noise are fed to the equipment under test with the output being measured directly as an intelligibility index without the need for a comparison to signals free of noise. The present apparatus reduces the computation time by making the intelligibility index determination a simple electronic measurement and arithmetic summation.

Accordingly, a primary object of the present invention is the provision of an apparatus for determining intelligibility of an information signal immersed in noise as a direct electronic measurement with out the need for comparison to a signal free of noise.

Another object is the provision of an apparatus for predicting the effect on intelligibility of information signals and speech by an equipment under test of simulated information signal conditions.

A further object is the provision of an apparatus for rapidly testing information signal traversing equipment for determining the effect of such equipment on the intelligibility of the information signal in the presence of noise.

And another object is the provision of an apparatus for testing communications equipment for the effect of noise on the intelligibility of signal information traversing the equipment.

And a still further object is the provision of an apparatus for predicting the intelligibility of speech information in the presence of noise traversing through equipment under test without the use of actual speech signals in the test.

These objects, features and advantages are achieved generally by providing a plurality of electric signal sources, each representative of a frequency band of equal importance in the over all signal spectrum, an electric coupling circuit for feeding the signals of the signal sources to the equipment under test, a plurality of filter channels for receiving the signal output of the equipment under test, one of the channels for isolating the signal of each of the bands of equal importance, and an apparatus for measuring the total signal to noise ratio of the combined bands of equal importance.

By using a single frequency sinusoidal signal source for each of the bands of equal importance, a readily identifiable signal, even when immersed in noise, is thereby achieved. A knowledge of frequency and phase is sufficient to identify this sinusoidal wave form in noise and the frequency and phase parameters are relatively easily obtained from the reference source.

By using a signal falling within the arithmetic mean of amplitude and frequency of each of the equally contributing bands or bands of equal importance of an idealized long time average spectrum of each band of equal importance, a desirable amplitude, frequency distribution of the test or simulated speech representative of and resembling the characteristics of actual speech is thereby achieved.

By using ten equally contributing bands covering the overall spectrum with frequency limits 200, 500, 800, 1130, 1500, 1900, 2338, 2900, 3700, 4700, and 7000 cycles per second respectively, sufficient repetitive accuracy is obtained for usual test purposes.

By using sinusoidal signals in each of the equally contributing bands with the sinusoidal signal at the arithmetic means of each of the bands, namely 350, 650, 965, 1350, 1700, 2125, 2650, 3300, 4300, and 5950 cycles per second respectively and each with an amplitude level substantially equal to that of the idealized, long time average spectrum of speech, suitable simulation of actual speech conditions is obtained by adding the signals together to thereby form a test signal as a simulated speech spectrum for application to the equipment under test.

By providing a high and low pass filter series circuit for each of the bands of equal importance, a ten channel system for examining each of the bands of equal importance is thereby achieved.

By subtracting the signal from the output of each channel and unitizing the noise therein, then measuring the amount of signal subtracted therefrom, the direct proportion of signal to noise is thereby achieved for the respective channel. Unitizing, as herein used, refers to adjusting the level of noise and signal to bring the value of the noise in the signal-plus-noise-output from the filter in a channel to unity, thereby causing direct measurement of the signal to indicate directly the signal to noise ratio in the channel.

By feeding the output of the filter circuit to a signal subtraction network along with the appropriate sinusoidal signal shifted in phase by 180°, a cancellation or subtraction of the signal is thereby achieved. The noise alone will remain for unitizing as described above.

By feeding the unitized signal-plus-noise to a correlator and low pass filter to which is also fed the signal shifted in phase for maximum correlator output separation of signal from the noise in a unitized signal-plus-noise is thereby achieved.

By storing such signal level in each of the channels in a summation circuit, an arrangement for totalizing the signal value as a directly measurable intelligibility index is thereby achieved.

These features, objects and advantages will become more apparent from the following description taken in connection with the accompanying drawings of a preferred embodiment of the invention and wherein:

FIG. 1 is a partially block and partially schematic diagram of a preferred embodiment of the invention.

FIG. 2 is a graph showing the general character of long time average speech signals for more clearly illustrating operation of the embodiment of FIG. 1.

Referring to FIG. 1 in more detail, an apparatus for measuring the intelligibility of information signals in accordance with the present invention is designated generally by the numeral 10. The intelligibility measuring apparatus 10 is particularly adapted for running tests on equipment 12 such as radio receivers, transmitters or combined receiving and transmitting systems to determine the intelligibility of electric information signals which have traversed therethrough under preselected noise conditions.

For supplying simulated signals to the equipment under test 12, the apparatus 10 includes ten single frequency oscillators 14, 16, 18, 20, 22, 24, 26, 28, 30 and 32, the outputs of which are fed through adder resistors 34, 36, 38, 40, 42, 44, 46, 48, 50 and 52 respectively, a cathode follower 54, and an adder circuit 56 to the equipment under test 12. The ten oscillators, 14 through 32, each produce a single frequency sinusoidal signal representing a frequency band of equal importance in an idealized long-time average spectrum of speech such as shown by curve 58 in FIG. 2. Each of the oscillators 14 through 32 represents a channel devoted to a band of frequencies of equal importance in the speech spectrum of FIG. 2. In the present instance only ten bands of equal importance are found to produce adequate results for general purposes. These ten bands are used in place of the twenty bands of equal importance described in application Serial No. 687,421, now Patent No. 2,958,729, entitled "Information Signal Intelligibility Measuring Apparatus," Joseph C. Licklider, inventor. While ten bands of equal importance have been used in the present embodiment, additional bands may also be used where more accurate results are desired by following the structural principles herein contained in the description of the present embodiment. In the present embodiment of ten bands of equal importance, the band limits found suitable are 200, 500, 800, 1130, 1800, 1900, 2360, 2900, 3700, 4900, and 7000 cycles per second. The frequencies used in the oscillators 14, 16, 18, 20, 22, 24, 26, 28, 30, and 32 are chosen so as to fall at the arithmetic mean of each of these ten bands of equal importance so that the signal representing the particular band of equal importance, as nearly as possible, simulates actual conditions of the band it represents. This mean frequency for each of these bands has been taken at 350, 650, 965, 1350, 1700, 2125, 2650, 3300, 4300 and 5950 cycles per second respectively. Also to closely simulate the characteristic intensity in the respective bands of equal importance, the amplitudes of the signals have been set within the respective oscillators to have a relative distribution with respect to each other similar to that for the idealized long-time average spectrum for speech shown in FIGURE 2. Also, in the present instance, the signals from the oscillators 14 through 32 are chosen as sinusoidal signals because of the relative ease with which such signals may be identified and measured in the presence of noise and distortion. For such identification, analogous frequency and phase are sufficient, even when immersed in noise, and these parameters are relatively easily obtainable from a reference source, as will be hereinafter further described.

While this embodiment is particularly adapted for the frequency spectrum shown in the graph in FIGURE 2, the embodiment herein described is also applicable to other type information signals, after being preferably adapted to a characteristic signal spectrum particularly applicable to such other information signals.

In addition to sinusoidal signals from the oscillators 14 through 32, the adder circuit 56 also has fed thereto white noise from a conventional noise generator 60 set at a preselected amplitude level, suitable to the particular test involved by a variable amplifier 62. A white noise generator 60 is herein preferably used because of its even noise distribution throughout the sound wave spectrum of FIGURE 2, thereby permitting comparison of results of the present embodiment with other known intelligibility measuring methods. However, it may be desirable in some instances to use a noise generator 60 which generates other than white noise and which generates noise in specified frequency ranges, to determine the effect of such particular conditions on the equipment under test 12. It may also, under some conditions, be desirable to set the output of the noise generator 60 at zero so that no external noise reaches the equipment under test 12. Such arrangement permits, thereby, the obtaining of an indication of the distortion and noise due to the equipment 12 itself.

The output of the equipment under test 12 contains signal-plus-noise which is fed to ten pairs of high-pass and low-pass, series filters 64, 66, 68, 70, 72, 74, 76, 78, 80 and 82 constituting a ten channel filter network with each channel representing one of the herein-mentioned bands of equal importance in the speech spectrum. The pair of filters in each of the channels passes only those frequencies assigned to the corresponding band of equal importance. The output in each filter channel contains the signal-plus-noise portion of the signal plus noise output of the equipment 12 which has frequencies in the corresponding band of equal importance. Each of these ten filter channels has its output fed to a terminal in a switch 84 having a moveable switch arm 86 for selectively making electrical engagement between the selected filter channel and an amplifier 88 for suitable amplification of the respective filter channel output. The output of the amplifier 88 is fed through a variable unitizing resistor 90 to a signal subtract circuit 92. This signal subtract circuit may be similar to that described in our application Serial No. 706,495 entitled "Signal and Noise Level Determining Apparatus," filed December 31, 1958.

The signal subtract circuit 92 is also fed from a second variable unitizing resistor 94 which is coupled by a linkage 96 to the variable unitizing resistor 90 for varying the resistances uniformly and simultaneously in both unitizing resistors 90 and 94.

The variable unitizing resistor 94 is coupled to the output of a variable amplifier 98 which is fed by a phase shifter circuit 100. The phase shifter circuit 100 may be of conventional design, suitable embodiments of which are shown and described in our parallel application entitled "Signal and Noise Level Determining Apparatus," referred to above. The phase shifter circuit 100 is coupled to a moveable switch arm 102 in a switch 104. The movable switch arm 102 is arranged for making selective engagement with individual ones of ten terminals, each of which is electrically coupled for receiving the output of a corresponding one of the oscillators 14 through 32.

The moveable switching arm 102 in the switch 104 and the moveable switching arm 86 in the switch 84 are mechanically coupled by a linkage 106 for causing simultaneous movement by the switching arms 86 and 102, such that the sinusoidal signal from one of the oscillators, 14 through 32, fed to the phase shifter 100 will be the same as that from the corresponding band of equal importance, signal-plus-noise fed to the phase shifter 100 from the corresponding filter channel.

The output of the signal subtract circuit 92 is fed to a meter 108 for directly indicating the noise level from the selected one of filter channel 64 to 82 upon proper adjustment of the unitizing resistors 90 and 94, as will be hereinafter described.

The output from the variable unitizing resistor 90 is also fed to a correlator and low-pass filter 110. The correlator and low-pass filter 110 may be similar to that described in our application entitled "Signal and Noise Level Determining Apparatus," mentioned above.

A second phase shifter circuit 112, similar to the phase shifter circuit 100, also feeds the correlator and low-pass filter 110 with the corresponding sinusoidal frequency signal selected from the corresponding one of the ten oscillators 14 to 32 by the moveable switching arm 102. The phase of the sinusoidal frequency signal is suitably adjusted in the phase shifting circuit 112 for maximum output from the correlator and low-pass filter 110. This maximum output from the correlator and low-pass filter 110 is fed through a logarithmetic attenuator 114 to a zero-centered meter 116. The logarithmetic attenuator 114 may be of any suitable type, as for example, the type known commercially as Kay-Lab, Log Aten. The function of the logarithmetic attenuator 114 is to change the output from the correlator and low-pass filter 110 directly to a decibel output for the particular channel. This decibel output from the logarithmetic attenuator 114 appears directly on the meter 116. It also appears through the meter 116 at an adjustable switching arm 118 in a switch 120. The switch 120 has ten terminals, each coupled to its corresponding one of ten potentiometer resistors, 122, 124, 126, 128, 130, 132, 134, 136, 138, and 140 in parallel across a potential source, such as a battery 142 in an analogue computer circuit 144. Each of the ten terminals in the switch 120 is also coupled through a corresponding variable, calibrating resistor in series with a pair of ten terminals carrying a shunting conductor as 146, 148, 150, 152, 154, 156, 158, 160, 162, and 164 to a grounded line 166. The grounded line 166 has a pair of terminals carrying a shunting conductor 168 therein between the ground connection and the shunt 164. A resistor 170 proportioned to produce an overall average output from the ten resistor circuits in the computor 144, as will hereinafter be described, is connected across the shunt 168. The shunting conductors 146, 148, 150, 152, 154, 156, 158, 160, 162, 164 and 168 are coupled through a linkage 172 to moveable switch arms 174 and 176, connected across a meter 178 and forming a part of a switch 180. The switch 180 is so arranged with the linkage 172 that the moveable switch arms 174 and 176 may be selectively coupled across any pair of the terminals carrying shunting conductors 146, 148, 150, 152, 154, 156, 158, 160, 162, 164, or 168. A switch of the type 180 is commercially available from P. R. Mallory and Company, Inc., Indianapolis, Indiana. When such coupling selection is made, the linkage 172 automatically removes the particular shunting conductor involved so that the meter 178 is interposed in the circuit across the terminals previously occupied by the corresponding shunting conductor. Thus, for example, if the moveable switch arms 174 and 176 are coupled across the terminals of the shunt 146, the shunt 146 thereby is removed and the meter 178 is electrically interposed between the ground line 166 and corresponding variable channel calibrating resistor 182. For purposes of calibration for operation with the channel carrying resistor 182, the calibrating resistor 182 is adjusted to a position such that when moveable arm 184 is at the top of the potentiometer resistor 122 so as to be coupled directly to the positive terminal of the battery 142, there will be a full scale reading on the meter 178. The meter 178 may be calibrated for reading out a suitable intelligibility index, such as, for example, zero to one hundred percent intelligibility or zero to one or other desired scale.

Each of the calibration resistors 182 in each of the ten channels in the computer 144 is similarly adjusted for full scale reading on the meter 178. Similarly, the resistor 170 is proportioned with a value such that when the moveable arms on the potentiometers 122 through 140 are all at the top of the resistors and thereby directly coupled to the positive terminal of the battery 142, there will be a similar full scale reading on the meter 178 when coupled across the terminals of the shunt 168.

In the operation of the intelligibility measuring apparatus 10, the ten single frequency sinusoidal signals from the oscillators 14 through 32, each having the characteristic amplitude of the corresponding band of equal importance hereinabove described, is fed, together with noise from the noise generator 60 at a preselected amplitude level set on the amplifier 62 through adder 56 to the equipment-under-test 12. This application of signal-plus-noise to the equipment-under-test 12 is in a manner simulating the way in which it would normally enter equipment-under-test 12 such as at the input terminals of the equipment-under-test 12.

The signal-plus-noise output of the equipment-under-test 12 then is fed for analyzing to the filter channels 64 through 82. The moveable switch arms 86 and 102 are synchronously set by the linkage 106 to a selected channel and corresponding oscillator for supplying both the particular channel output of a selected frequency band of equal importance and the corresponding sinusoidal signal to the signal subtract circuit 92.

The variable phase shifter 100 and the variable amplifier 98 are then manually adjusted for minimum output reading from the signal subtract circuit 92 on the meter 108. When such minimum reading on the meter 108 is obtained by proper adjustment of the variable phase shifter circuit 100 and the variable amplifier 98, it is indicative of a cancellation of the sinusoidal signal from the signal-plus-noise reaching the signal subtract circuit 92 from the selected one of the filter channels 64 to 82. The output from the signal subtract circuit at this null position will therefore be the noise level alone. In the instance where noise input level is set at zero, the noise value in the output will be that caused by the equipment.

Having found this null position or noise level on the meter 108, the unitizing variable resistors 90 and 94 are then manually adjusted simultaneously by means of the linkage 96. The adjustment is carried out in a direction to effect a full scale or unit reading on the meter 108. Such unit reading on the meter 108 thereby produces a signal and noise amplitude value in the signal-plus-noise fed to the correlator and low-pass filter 110, such that the signal amplitude is directly readable as a signal to noise ratio. Such proper amplitude level output effected by the unitizing resistors 90 and 94 is herein termed unitizing the signal-plus-noise.

The correlator and low-pass filter 110 is now fed with the unitized signal-plus-noise. It is also at the same time fed with the single frequency sinusoidal signal from the corresponding channel oscillator through the variable phase shifter 112. The variable phase shifter 112 is adjusted for a maximum reading on the zero centered meter 116. Because of the logarithmetic attenuator 114, the meter 116 indicates the output of the correlator and low-pass filter directly in decibels. As explained in our above mentioned application entitled "Signal and Noise Level Determining Apparatus," the output of the correlator and low-pass filter 110 is directly the signal level of the unitized signal-plus-noise input to the correlator and low-pass filter 110. Thus the zero centered meter 116 has directly thereon a measure in decibels of the signal intensity in the signal-plus-noise.

The linkage 106, also simultaneously with moveable switch arms 86 and 102, moves the moveable switch arm 118 to a terminal in the switch 120 in a selected channel in the computer 144 corresponding to the channel of a frequency band of equal importance in the filter channel just described. In the embodiment shown in FIGURE 1, this channel would be the one including the potentiometer resistor 134. By adjusting moveable arm 186 on the potentiometer resistor 134 until a zero reading is obtained on the meter 116, the signal level value from the correlator and low-pass filter 110 is thereby stored on the potentiometer 134. This stored value may be read out directly as an intelligibility index reading by the moveable switch arms 174, 176 across the terminals of the shunt 158 and removing the shunt 158 as described above.

In this manner the signal level in each of the ten channels may be stored on the respective channel potentiometer 122 through 140 of the computer circuit 144.

After such an intelligibility index value is stored in each of the potentiometers 122 through 140, representing the contribution of each of the bands of equal importance, an overall average of these contributions by each of the bands of equal importance may be then read out or indicated on the meter 178 by connecting the moveable switch arms 174 and 176 across the terminals of the shunt 168, as hereinabove described. This average indication on the meter 178 becomes directly the intelligibility index of the signal in the signal-plus-noise output from the equipment-under-test 12. While this intelligibility index was obtained in connection with 10 sinusoidal frequency signals, nevertheless, because of the careful selection of the frequencies and amplitudes of the sinusoidal signals as hereinabove explained, such intelligibility index becomes a good approximation of and a close prediction of the actual intelligibility of speech under similar noise conditions in the equipment-under-test 12.

It is seen that obtaining such intelligibility index value on a particular equipment-under-test by the intelligibility measuring apparatus 10 entails only the relatively simple operations of selecting the individual channels and adjusting circuits to desired readings on the meters 108 and 116 as described above.

It should be noted here that the apparatus 10 is inherently capable of producing accurate results even where the difference between the signal and noise levels is small. For example, in such instance where the difference between the signal and noise levels is small, a minimum reading on the meter 108 at the output of the signal subtract circuit 92 will result in only small variations as the amplifier 98 and variable phase shifter 100 are adjusted. Because of such slight variations it is conceivable that the adjustments on the amplifier 98 and variable phase shifter 100 will not be at the exact position for producing exact null point on the meter 108. Thus a measurement of the signal under such conditions at the output of the unitizing resistor 94 might be in substantial error as a percentage of the true signal level in the signal-plus-noise output from the unitizing resistor 90 to the signal subtract circuit 92. However, in the correlator and low-pass filter 110, the true signal level in the signal-plus-noise fed to the correlator and low-pass filter 110 is accurately obtained and fed through the logarithmetic attenuator 114 to the meter 116 as described above.

This invention is not limited to the details of construction and operation herein described, as equivalents will suggest themselves to those skilled in the art.

What is claimed is:

1. In an apparatus for predicting the response of signal traversing equipment to information signals in the presence of noise, the combination of a source of single frequency sine waves, each representative of a band of frequencies of substantially equal importance to intelligibility of said information signals, a source of noise, means for applying the sine waves and noise to an equipment under test, a plurality of filter means coupled to the output of the equipment under test, each of the filter means for passing frequencies of a different band of equal importance, means coupled to the source of sine waves and filter means for subtracting the sine wave from the sine wave-plus-noise in the corresponding band of equal importance, means coupled to the subtracting means for raising the amplitude level of the sine wave-plus-noise in said band of equal importance to a preselected level of the noise component, means in responsive relation to the changed amplitude level sine wave-plus-noise for determining the intensity of the sine wave in the changed amplitude level sine wave-plus-noise, means for storing said determined intensity value for each of said bands, and means for obtaining the average of all said stored values.

2. In an apparatus for predicting the response of signal traversing equipment to information signals in the presence of noise, the combination of a plurality of filter channels, each for passing a separate band of frequencies of substantially equal importance to intelligibility in the overall spectrum of said signals, means for applying to said filters a plurality of single frequency signals plus noise, each of the single frequency signals being representative of a separate band of equal importance in said spectrum, means coupled to the plurality of the single frequency signal means and filter means for changing the amplitude level of the output from the filter means to a preselected value of the noise component, means coupled in receiving relation to said changed level output for determining the changed amplitude single frequency signal level in each of the bands of equal importance, and means coupled to said last mentioned means for combining said individual signal level determinations in a preselected manner to provide a basis for comparison.

3. In an apparatus for predicting the response of signal traversing equipment to information signals in the presence of noise, the combination of a plurality of filter channels, each for passing a separate band of frequencies of equal importance to intelligibility in the overall spectrum of said signals, means for applying to said filter channels a plurality of single-frequency signals plus noise, each of the single-frequency signals being representative of a separate band of frequencies of equal importance to intelligibility in said spectrum, means coupled to the plurality of single-frequency signal means and filter means for changing the amplitude level of the signal-plus-noise output from the filter means, and means coupled to the amplitude level changing means for the determining of the overall level of the single-frequency signals in said changed amplitude output.

4. In an apparatus for predicting the intelligibility of information signals in the presence of noise, the information signals being of the type wherein the information signal frequency spectrum is divided into frequency bands of substantially equal importance to intelligibility, the combination of a source for a single-frequency signal having a frequency representative of a band of equal importance, a noise source, filter means for isolating the frequencies in said band of equal importance, means coupled to the signal and noise sources for applying the single-frequency signal and noise to the filter means, means coupled to the filter means for changing the amplitude level of the signal and noise from the filter to a preselected value of the noise, and means coupled to the amplitude level changing means for determining the level of said single-frequency signal from said amplitude level changing means.

5. In an apparatus for predicting the intelligibility of information signals in the presence of noise, the information signals being of the type wherein the information signal frequency spectrum is divided into frequency bands of substantially equal importance to intelligibility, the combination of a source for a single-frequency signal having a frequency representative of a band of equal importance, a noise source, filter means for isolating frequencies in said band of equal importance, means coupled to the signal and noise sources for applying the single-frequency signal and noise to the filter means, means coupled to the signal source and filter means for isolating the noise from the output of said filter means, means in said last mentioned means for setting the value of the signal-plus-noise from said filter means to an intensity level such that the isolated noise is at a unit reference value, means coupled to said setting means for isolating the signal in the reset signal-plus-noise, and means coupled to said signal isolating means for determining the level of said isolated signal.

6. In an apparatus for testing signal traversing equipment having a signal input and a signal output for information signals in an information signal frequency range characterized by a frequency spectrum divided into frequency bands, the combination of a plurality of signal sources, each for generating a single frequency signal of controlled intensity, each such signal in a separate band of frequencies in said spectrum range, means coupled to the signal generating sources for simultaneously applying said signals to the input of the equipment under test, a means for each of the bands adapted to the output of the equipment under test, each means for isolating the emanations from the output in the corresponding one of said frequency bands, and means coupled to said isolating means for determining the ratio of the single frequency signal to other frequency emanations in the isolated band.

7. In an apparatus for testing signal traversing equipment having a signal input and a signal output for information signals characterized by a frequency spectrum composed, of frequency bands of substantially equal importance to intelligibility of the information signals, the combination of a source of a plurality of single frequency signals, each within a separate one of said bands of equal importance, means for applying said plurality of single frequency signals simultaneously to the input of the equipment under test, a means for each of the bands adapted to the output of the equipment under test, each means having a bandwidth coextensive with the respective band for isolating emanations from the output in the corresponding one of said bands, and means coupled to said isolating means for determining the ratio of the single frequency signal to other frequency emanations in the respective bands.

8. In an apparatus for testing signal traversing equipment having a signal input and a signal output for information signals characterized by an amplitude versus frequency spectrum composed of frequency bands of substantially equal importance to intelligibility of the information signals, the combination of a source of a plurality of single frequency signals, each for one of the bands in the spectrum and having a frequency equal to the arithmetic mean of the frequencies in the corresponding band and an amplitude corresponding to the amplitude at its frequency position in the spectrum, means for applying said plurality of single frequency signals to the input of the equipment under test, a means for each of the bands adapted to the output of the equipment under test, each means having a bandwidth coextensive with the respective band for isolating emanations from the output in a corresponding one of said bands, and means coupled to the isolating means for determining the ratio of the single frequency signal to other frequency emanations in the respective band.

9. In an apparatus for testing signal traversing equipment having a signal input and a signal output for information signals in an information signal amplitude versus frequency spectrum, the combination of a source of a plurality of single frequency signals, each single frequency signal having a frequency and amplitude identified with a separate band of frequencies in the spectrum, means coupled to the signal source for applying said plurality of single frequency signals to the input of the equipment under test, a means for each of the bands adapted for the output of the equipment under test, each means having a bandwidth coextensive with the respective band for isolating emanations from the output in the corresponding one of said frequency bands, means coupled to the isolating means for determining the ratio of the single frequency signal to other frequency emanations in each of the bands, and means for combining said determinations.

10. In an apparatus for testing communication equipment, having a signal input and a signal output, for its effect on speech information signals characterized by a long time average amplitude versus frequency spectrum, the combination of a source of a plurality of single frequency sinusoidal signals, each being amplitude and frequency representative of a corresponding frequency band of substantially equal importance to intelligibility in the spectrum, means for applying said plurality of single frequency signals to the input of the equipment under test, a means for each of the bands adapted to the output of said equipment under test, each means having a bandwidth coextensive with the band for isolating emanations from the output in the corresponding one of said bands of equal importance, and means coupled to said isolating means for obtaining the ratio of the single frequency signal to other frequency emanations in each of said bands.

11. In an apparatus for testing communications equipment for its effect on speech information signals characterized by a long time average amplitude versus frequency spectrum divided into ten frequency bands of substantially equal importance to intelligibility of said speech information signals, the combination of a source of ten sinusoidal signals, each having an amplitude and frequency equal to the arithmetic mean of a corresponding frequency band of equal importance, means for applying said signals simultaneously to the input of the equipment under test, means for receiving the output of the equipment under test, said receiving means including means for raising the amplitude level of the signal-plus-noise in a selected band to a preselected noise amplitude level, means coupled to the last mentioned means for isolating the single frequency signal in said raised amplitude signal-plus-noise, and means coupled to the isolating means for determining the amplitude of said isolated raised amplitude single frequency signal.

References Cited in the file of this patent

UNITED STATES PATENTS

| | | |
|---|---|---|
| 1,794,393 | Brown et al. | Mar. 3, 1931 |
| 1,816,958 | Clark et al. | Aug. 4, 1931 |
| 2,408,858 | Keizer | Oct. 8, 1946 |
| 2,629,000 | Olson et al. | Feb. 17, 1953 |
| 2,958,729 | Licklider | Nov. 1, 1960 |